United States Patent
Schield

(10) Patent No.: US 8,701,363 B2
(45) Date of Patent: Apr. 22, 2014

(54) WINDOWS, DOORS AND GLAZING ASSEMBLIES THEREFOR

(75) Inventor: Edward L. Schield, Medford, WI (US)

(73) Assignee: Weather Shield Mfg., Inc., Medford, WI (US)

(*) Notice: Subject to any disclaimer, the term of this patent is extended or adjusted under 35 U.S.C. 154(b) by 1058 days.

(21) Appl. No.: 12/500,005

(22) Filed: Jul. 9, 2009

(65) Prior Publication Data

US 2009/0266015 A1 Oct. 29, 2009

Related U.S. Application Data

(63) Continuation of application No. PCT/US2007/076777, filed on Aug. 24, 2007.

(51) Int. Cl.
*E06B 3/24* (2006.01)
*B32B 17/06* (2006.01)

(52) U.S. Cl.
USPC ............... 52/204.593; 52/204.6; 52/171.3; 428/34; 428/331; 428/428; 428/699

(58) Field of Classification Search
USPC ......... 52/171.3, 172, 204.1, 204.5, 204.593; 428/34, 331, 428, 432, 433–434, 428/699–702
See application file for complete search history.

(56) References Cited

U.S. PATENT DOCUMENTS

| | | | |
|---|---|---|---|
| 4,368,226 A * | 1/1983 | Mucaria | 428/34 |
| 5,091,258 A | 2/1992 | Moran | |
| 5,156,894 A | 10/1992 | Hood et al. | |
| 5,784,853 A * | 7/1998 | Hood et al. | 52/786.13 |
| 5,983,593 A * | 11/1999 | Carbary et al. | 52/786.11 |
| 6,223,414 B1 | 5/2001 | Hodek et al. | |
| 6,627,319 B2 | 9/2003 | Jacquiod et al. | |
| 2004/0222724 A1* | 11/2004 | Cording | 312/405 |
| 2005/0227025 A1* | 10/2005 | Baratuci et al. | 428/34 |
| 2006/0121315 A1* | 6/2006 | Myli et al. | 428/702 |
| 2006/0188730 A1* | 8/2006 | Varanasi et al. | 428/432 |
| 2006/0222863 A1* | 10/2006 | Nadaud et al. | 428/432 |

* cited by examiner

*Primary Examiner* — Jeanette E. Chapman
(74) *Attorney, Agent, or Firm* — Honigman Miller Schwartz and Cohn LLP; Douglas H. Siegel; Jonathan P. O'Brien

(57) ABSTRACT

The specification discloses a window or door, and glazing assemblies therefor, wherein the glazing assemblies include a first pane of glass with an exterior surface coated with a smooth, hardened silica-containing coating, and an opposite surface coated with at least one layer of a low emissivity coating. In one embodiment, a second pane of glass is joined to and spaced from the first pane of glass by a polymeric spacer. In a second embodiment, a third pane of glass is laminated to the second pane, and in a third embodiment, a third pane of glass coated on its interior surface with a low emissivity coating is joined to and spaced from the second pane by a polymeric spacer.

19 Claims, 2 Drawing Sheets

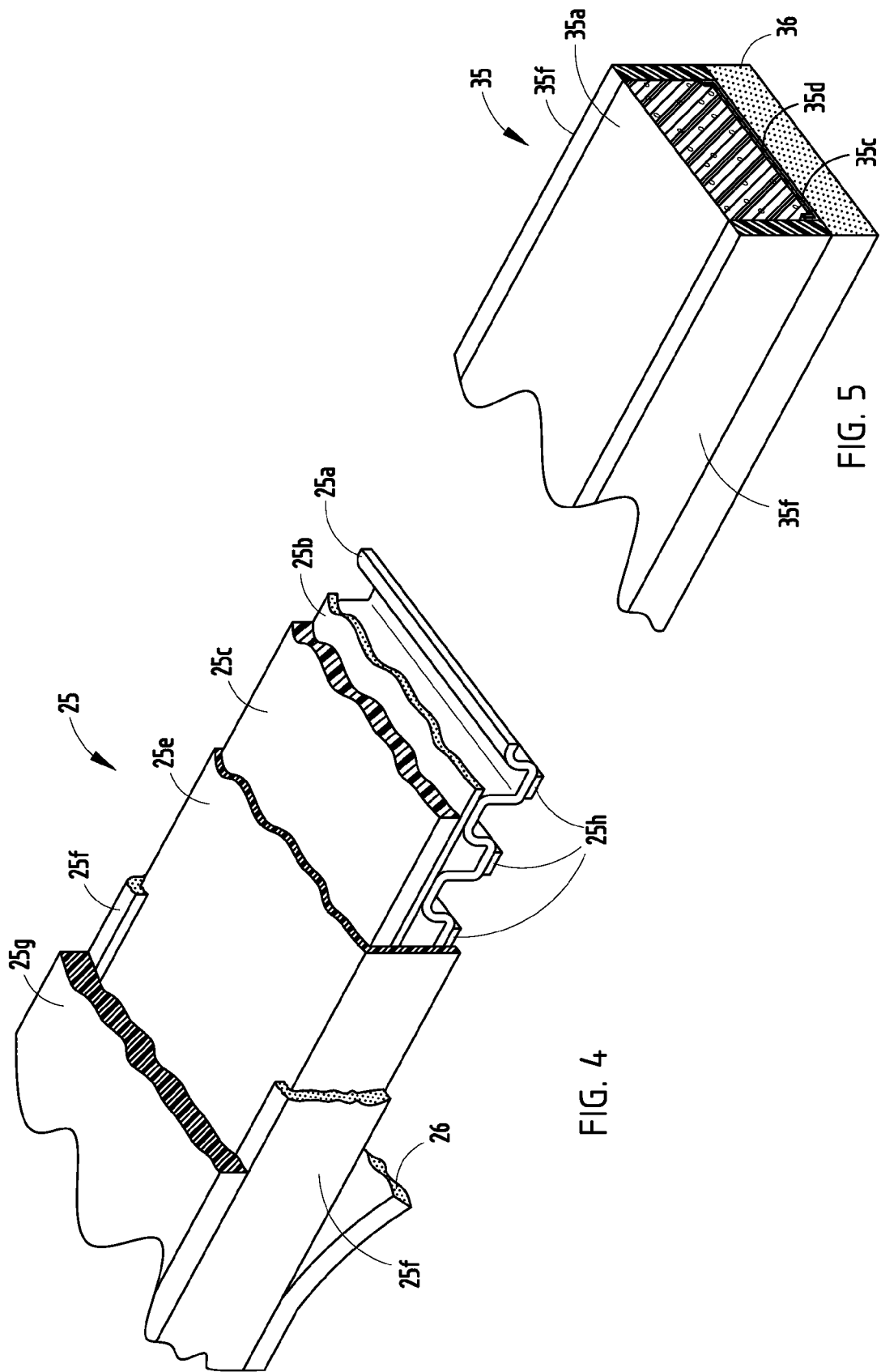

WINDOWS, DOORS AND GLAZING ASSEMBLIES THEREFOR

CROSS-REFERENCE TO RELATED APPLICATION

This application is a continuation of International Application No. PCT/US2007/076777 entitled WINDOWS, DOORS AND GLAZING ASSEMBLIES THEREFOR filed on Aug. 24, 2007.

BACKGROUND OF THE INVENTION

The present invention relates to windows, doors and glazing assemblies therefor. The term window is intended to include window walls, i.e. window assemblies which are sufficiently large that they are referred to as window walls.

SUMMARY OF THE INVENTION

The present invention comprises a window or door, and a glazing assembly therefor, wherein the glazing assembly includes a first pane of glass with an exterior surface coated with a smooth, hardened silica-containing coating, and an opposite surface coated with at least one layer of a low emissivity coating. At least a second pane of glass is joined to the first pane of glass by a polymeric spacer.

These and other features, aspects and objects of the invention will be more fully understood and appreciated by reference to the written specification and appended drawings.

BRIEF DESCRIPTION OF THE DRAWINGS

FIG. 3 is a cross section of an enlarged fragment of a third preferred embodiment glazing assembly;

FIG. 4 is a perspective view of a partially disassembled preferred embodiment spacer; and FIG. 5 is a perspective view of a partially disassembled alternative preferred embodiment spacer.

DESCRIPTION OF THE PREFERRED EMBODIMENTS

Figure 1:
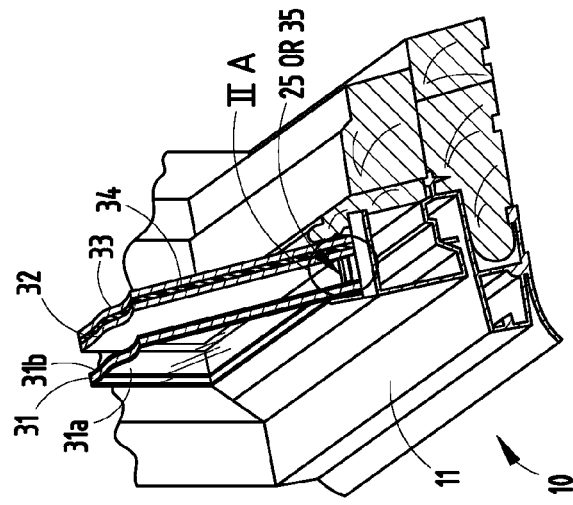
FIG. 1 is a cross section of a portion of a door or window, including a preferred embodiment glazing assembly.

In a first preferred embodiment (FIG. 1), a door or window 10 includes a frame 11 which receives a first preferred embodiment glazing assembly 20. Glazing assembly 20 includes a first or exterior pane of glass 21. The outwardly or exterior facing surface of exterior pane 21 is coated with a smooth hard silica-(silicon dioxide)-containing coating 21a. The opposite, interior facing surface of exterior pane 21 is coated with a low emissivity coating 21b. Low emissivity coating 21b comprises at least one layer of low emissivity coating, preferably two and most preferably three layers of low emissivity coating. The smooth, hard silica-containing coating 21a helps to keep the exterior surface of pane 21 clean, and makes it easier to clean when cleaning is needed.

Low-emissivity coatings for glass typically include one or more infrared-reflective layers each positioned between two or more transparent dielectric layers. The infrared-reflective layers reduce the transmission of radiant heat through the coating (e.g., by reflecting infrared radiation), keeping heat out during the summer and keeping it in during the winter. These infrared-reflective layers typically comprise conductive metals, such as silver, gold, or copper. In some cases, the inner infrared-reflective layer comprises a corrosion-resistant silver alloy. Preferably, the alloy comprises a major portion of silver and a minor portion (about 10 mole percent) of a durable metal, the durable metal being a metal other than silver. Preferably, the durable metal is a metal selected from the group consisting of platinum, palladium, copper, nickel, gold, indium, zinc, silicon, boron and beryllium. The transparent dielectric layers are used primarily to reduce visible reflectance and to control other coating properties, such as color. Commonly used transparent dielectrics include oxides of zinc, tin, and titanium, as well as nitrides, such as silicon nitride.

Any conventional method can be used to deposit the layers of the silica and low emissivity coatings. Preferably, each layer is deposited by sputtering. Magnetron sputtering chambers and related equipment are commercially available from a variety of sources (e.g., Leybold and BOC Coating Technology). Useful magnetron sputtering techniques and equipment are disclosed in U.S. Pat. No. 4,166,018 (Chapin). The sputter coating process for depositing the silicon dioxide coating may use a target comprising silicon with about 5% aluminum, sputtered in an oxidizing atmosphere. Glass coated on one surface with such a silica-containing coating and coated on the opposite surface with two or three layers of low emissivity coating material is available for commercially from Cardinal CG Company, Eden Prairie, Minn.

A second glass pane 22 is joined to and separated from first pane 21 by polymeric spacer 25. The term "polymeric spacer" as used herein means that at least the principle insulating component or components of the spacer is or are polymeric. However, the term "polymeric spacer" is intended to include polymeric spacers with metal stiffeners or stabilizers, metal foil moisture barriers, and possibly other minor components of metal unless otherwise specified. The more preferable polymeric spacers have at least polymeric stiffeners or stabilizers.

Moving from bottom to top as shown in FIG. 4, which corresponds to moving from the exterior to the interior side of spacer 25 when it is installed, polymeric spacer 25 comprises includes an inwardly flexible, laterally stable corrugated stabilizer 25a, an adhesive sealant layer 25b, a generally planar strip of rigid but bendable material, referred to herein as lateral stiffener 25c, an adhesive coated, substantially impermeable moisture barrier 25e, strips of edge adhesive sealant 25f on each edge of spacer 25, and a desiccated top matrix 25g. The preferred method of manufacturing the sealant/spacer assembly 25 is by co-extrusion.

Inwardly flexible, laterally stable stabilizer 25a gives body or backbone to spacer 25, making it easier to handle and install. Stabilizer 25a can be formed of any material having sufficient rigidity to resist compressive forces exerted in a direction normal to the parallel planes in which the edges of the corrugated stabilizer lie. Yet, it is corrugated to give it sufficient flexibility in planes passing vertically between its side edges that it can be coiled inwardly, and can be bent inwardly at the corners of the glass panes it is joining and spacing. The term "inwardly," or "inwardly flexible," is used to mean that stabilizer 25a can be coiled or bent towards the interior space between the panes of glass which it secures together and spaces. The corrugations of stabilizer 25a are generally transverse to its longitudinal axis to ensure flexibility for bending, coiling or winding inwardly. Suitable materials of which stabilizer 25a can be made include steel, stainless steel, aluminum, coated paper, cardboard, plastic, foamed plastic, metallicized plastic or laminates of any combination of the above. As noted above, stabilizers 25a of polymeric material are preferred over those of metal. Polycarbonates are most preferred.

Adhesive strip or layer 25b which overlies stabilizer 25a adheres stiffener 25c to the peaks of the corrugations of stabilizer 25a. Layer 25b is coextensive with and is adhered to the bottom of lateral stiffener 25c. A wide variety of materials may be used as the base for the adhesive sealant layer 25b, including polysulfide polymers, urethane polymers, acrylic polymers, and the styrene-butadiene polymers. Included among the latter are a class of thermoplastic resins which, when below their flow temperature, exhibit elastic properties of vulcanized polymers. Such resins are sold by Shell Chemical Co. under the trademark "Kraton." A preferred class of sealants are butyl adhesives, most preferably a pressure sensitive adhesive which is thixotropic.

Stiffener 25c is a polymeric member, as for example a polycarbonate. It is an elongated strip which is the width of stabilizer 25a, and which is generally coextensive with the length and width of stabilizer 25a. Lateral stiffener 25c helps prevent spacer 25 from twisting about its longitudinal axis. Lateral stiffener 25c acts as a longitudinally stabilizing backing for stabilizer 25a, that inhibits stabilizer 25a from stretching along its longitudinal axis. Stiffener 26c improves the bond line formed between the edge sealant 25f and the glazed structures 21,22 by keeping the sealant 25f in contact with both glazed members 21, 22. Lateral stiffener 25c may be pleated or crimped to facilitate forming corners. Pleated as used herein means any formation in the stiffener 25c that allows stretching when forming corners. Thus, as used herein, pleated includes pleats, gussets, crimps or folds. Pleats allow for sharper corners without tearing or otherwise damaging the spacer assembly 25. Pleats also provide for flexibility necessary to bend spacer assembly 25 into corners and to allow for coiling of the spacer assembly 25.

Another layer of sealant adhesive overlies stiffener 25c, and wraps down over the edges of stabilizer 25a. The same types of adhesive material can be used for the adhesive overlying the stiffener 25c as for 25b. This adhesive layer adheres substantially impermeable moisture vapor barrier 25e material to stiffener 25c. Vapor barrier 25e overlies stiffener 25c and is wrapped down over and covers the side edges of adhesive layer, stiffener 25c and stabilizer 25a. Moisture barrier 25e may be fabricated from aluminum foil, plastic, paper, plastic paper, metallicized plastic, metal or laminates formed from any suitable combination such that vapor barrier 25e is stretchable so that it does not tear or bunch when spacer 25 is coiled or bent to conform to corners. A laminate film that is suitable as vapor barrier 25e is a film having layers of polyester, aluminum foil and a copolymer. Another laminate film that is suitable for use as vapor barrier 25e is a laminate film having layers of nylon, aluminum foil and polyethylene copolymer.

Edge adhesive sealant 25f overly the edges of the above assembly, and wrap slightly over the top and bottom surfaces of spacer 25. The same types of adhesive material can be used for edge adhesive sealant 25f as for the adhesive layer 25b. A butyl adhesive is preferred, as this gives an excellent seal and adhesion to glass panes 21 and 22. For most applications, the thickness of the sealant adhesive layers 25f extending beyond the edges of stabilizer 25a and lateral stiffener 25c should be in the range of 0.005-0.015 inch for each edge after the sealant 26f is compressed between the members 21, 22. Because the surfaces of tempered glass may not be as flat as the surfaces of untempered glass, somewhat greater thicknesses may be required to provide tempered glass with an adequate seal.

A desiccant carrying matrix layer 25g is placed on top of vapor barrier 25e. Matrix layer 25g can be any of a number of different polymeric materials, including silicone foam the same sealant adhesive material as is used in the other adhesive layers, e.g., butyl adhesive. The desiccant can be carried in a coating or layer applied over desiccant carrying matrix 25g, but is preferably carried in the matrix material itself. A particularly suitable class of desiccant is synthetically produced crystalline zeolite sold by UOP Corporation under the name "Molecular Sieves." Another desiccant which may be used is silica gel. Combinations of different desiccants are also contemplated. This use of desiccants keeps moisture concentration low and thus prevents the moisture from condensing on and fogging interior surface of the glass sheets when the window assembly is in service. Additional desiccant above the amount required to absorb the initial moisture content is included in desiccant matrix 25g in order to absorb additional moisture entering the window assembly over its service life. Preferably, matrix 25g comprises about 40% desiccant.

Desiccant can also be incorporated within the deformable adhesive sealant layers 25f or, alternatively, a different material containing desiccant can be used and co-extruded or otherwise applied to sealant 25f. Each of the bottom peaks of stabilizer 25a is capped with a strip of adhesive 25h. This facilitates finishing and sealing spacer 25 at its corners, as will be described below. Spacers such as spacer 25 can be purchased from TruSeal Technologies, Inc. of Beachwood, Ohio.

Finally, in a most preferred embodiment of spacer 25, and especially for larger windows, an outer strip of hot melt adhesive sealing material, referred to as the outer sealing strip 26, is applied over the bottom, or outer, surface of stabilizer 25a, after the above described assembly is in position between the panes of glass which it joins and separates. A hot melt butyl adhesive is preferred. Outer sealing strip 26 is shown in FIG. 4 being peeled away from the bottom of stabilizer 25a.

In an alternative embodiment (FIG. 5), spacer 35 can be an elongated semi-rigid silicone foam strip 35a. By semi-rigid, it is meant that the foam material has the rigidity of a thick leather belt. Foam strip 35a is desiccated, for the reasons discussed above. Preferably, the silicone foam matrix contains about 40% desiccant.

The bottom, i.e. the exterior surface of strip 35a is preferably covered with adhesive sealant layer 35c and moisture barrier layer 35d, in a manner similar to that in which stiffener 25b and stabilizer 25a are covered with adhesive layer 25c and vapor barrier 25d. Layers 35c and 35d wrap around the bottom edges of foam strip 35a and extend up its sides about a sixteenth of an inch.

The side edges of this assembly are covered with edge adhesive strips 35f, comparable to edge adhesive strips 25f of spacer 25. Spacer assemblies such as spacer 35 can be purchased from Edgetech I.G., Inc., of Cambridge, Ohio. Once this sub-assembly is positioned between panes of glass, an outer sealing strip of hot melt butyl adhesive 36 is applied to the exterior surface, which is comparable to optional outer sealing strip 26 of spacer 25.

Figure 2:
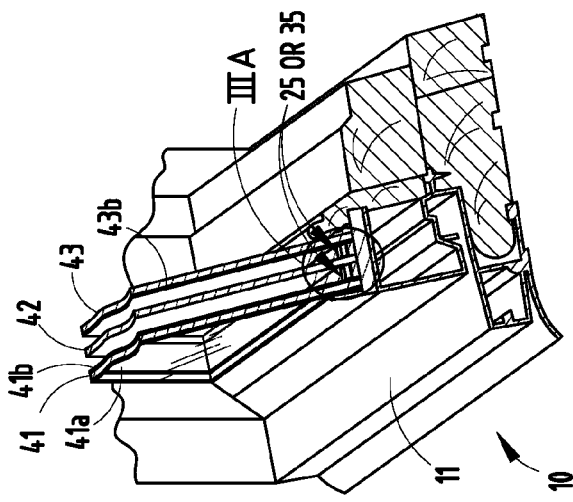
FIG. 2 is a cross section of an enlarged fragment of a second preferred embodiment glazing assembly.

FIG. 2 shows a second preferred embodiment glazing assembly 30 for use in a window, door or the like. Glazing assembly 30 comprises a first or exterior pane 31 having a silica coating 31a on the exterior spacing surface thereof, and a low emissivity coating 31b on the inwardly facing surface thereof. Coated pane 31 is the same type of coated pane as pane 21 of glazing assembly 20.

Glazing assembly 30 includes not only a second pane 32, but a third pane 33 which is laminated to second pane 32 via an inner polymer layer 34. Polymer layer 34 preferably comprises a layer of polyvinyl buterate which is at least 30 mils (0.030 inches) thick. A 60 ml polyvinyl buterate layer is preferred, and a 90 ml polyvinyl buterate layer is most preferred. A 90 ml layer not only gives increased strength and resistance to wind and other forms of breakage, it also cannot be cut from one side by a glass cutter. Hence, it also provides enhanced security.

This lamination of second pane 32, third pane 33 and inner polymer layer 34 is joined to and spaced from exterior pane 31 by spacer 25 or alternative spacer 35.

Figure 3A:
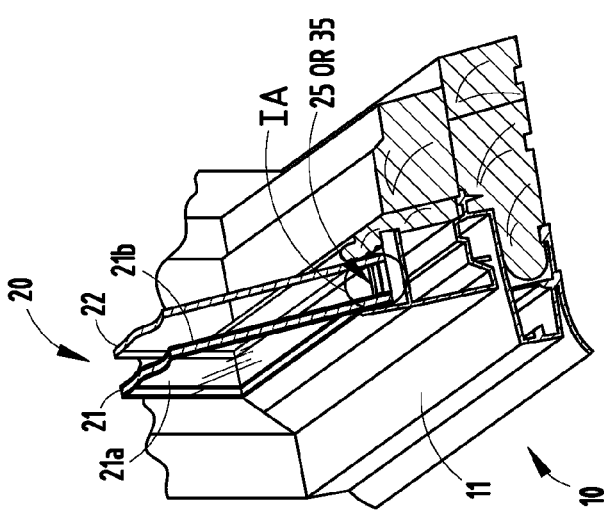
FIG. 3A is the enlarged cross section IIIA of FIG. 3.
Figure 3A:
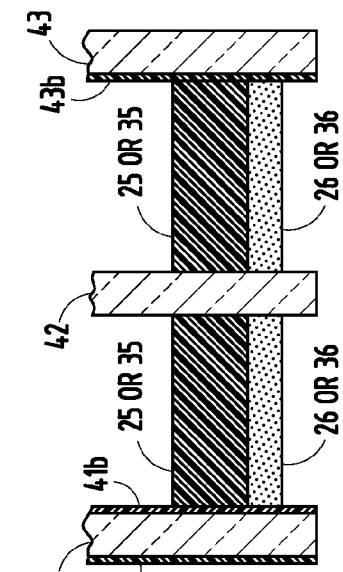
Figure 2A:
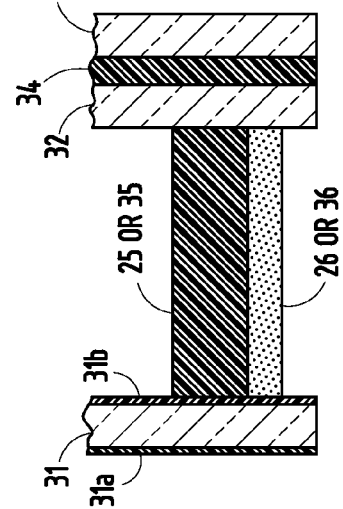
FIG. 2A is the enlarged cross section IIA of FIG. 2.
Figure 1A:
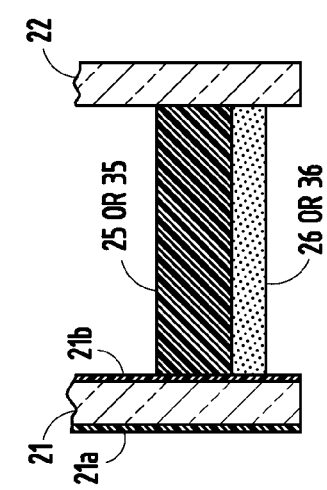
FIG. 1A is the enlarged cross section IA of FIG. 1.

The third preferred embodiment glazing assembly 40 shown in FIG. 3 comprises a first or exterior pane 41, which is like the first pane 31 or first pane 21 of glazing assemblies 30 and 20. It has a silica coating 41a and a lower emissivity coating 41b.

Glazing assembly 40 also has a second pane 42, which is comparable to the second pane 22 of assembly 20. Like pane 22, second pane 42 is secured to and spaced from first pane 41 by spacer 25 or alternative spacer 35. Glazing assembly 40 also includes a third pane of glass 43 which is joined to and spaced from second pane 42 by means of another spacer 25 or 35. Third pane 43 includes a low emissivity coating 43b on that side of third pane 43 which faces second pane 42.

Assembly of the panes of glass to a spacer 25 or 35, and thereby to each other, is preferably accomplished using robot assembly machinery. One of the panes of glass is positioned at a slight angle to vertical while a robot takes the spacer material off of a coil, applies it around the perimeter of the pane, starting and ending at a corner, and cuts it off leaving a short tail at the corner. The second pane of glass or assembly of panes of glass is then pressed against the applied spacer, thereby pressing the two panes and spacer together to effect an edge seal. The short tail of the spacer is pressed over the exposed adjacent portion of spacer in an overlapping fashion, such that it adheres to the underlying adhesive strips 25h on the bottoms of the peaks of stabilizer 25a, to complete the seal at the corner of the assembled glass. Optionally in the case of spacer 25 and always in the case of spacer 35, a liquid hot melt seal 26 or 36 is then applied over the exposed surface of spacer 25 or 35, between the attached panes of glass.

The space between the panes is filled with an insulating gas, such as argon, or an argon and krypton mix (95/5%). A vent tube may be provided for windows or doors which will be exposed to higher altitudes. These glazing assemblies will not be filled with an insulating gas.

The windows or doors of the present invention delivery unparalleled performance with regard to U-value, R-value, solar heat gain, light transmittance, condensation elimination and energy savings. The estimated energy savings for a typical home can range from 15-30% a year. U-values represent the amount of heat escaping within an hour's time through a window or door. The lower the U-value, the more energy efficient the door or window is. The U-values for clear insulated double-pane glass are typically around 0.4. By adding a low emissivity coating, that value drops to 0.3. The glazing assemblies of the windows and doors of the present invention have U-values of 0.2 to as low as 0.1. The 0.1 value is found for preferred embodiment 40. These values are based on "center of glass" determinations.

The glazing assemblies 20, 30 and 40 used in the present invention reduce window heat gain by 75%, compared to ordinary glazing assemblies, while providing up to 65% of visible light transmission (the percentage of incident light which is actually transmitted through the glazing assembly), based on center of glass measurements. Unlike tinted glass which dramatically reduces visible light transmission, glazing assemblies 20, 30 and 40 remain much more transparent to visible light.

Solar heat gain coefficient measures how well a window or door blocks the heat generated from sunlight. The lower the value, the less solar heat the glazing system allows through. Again, the numbers for clear, double-pane insulated glass are 0.6, while the addition of a low emissivity coating lowers that number to 0.4. The glazing assemblies 20, 30 and 40 of the present invention have solar heat gain values of 0.2. Again, these values are based on "center of glass" measurements.

When outside temperatures near 0° C., the glazing assemblies 20, 30 and 40 yield higher interior glass surface temperatures by as much as 6-8° F. (3-4° C.). The low emissivity coatings help protect the home's interior from harmful UVA and UVB radiation. This helps reduce the detrimental fading effects on draperies, furniture, floors, artwork and the like.

Table 1 below shows typical U-values, R-values, solar heat gain coefficients, visible light transmittance values and CRF-values for typical wood door and window configurations, using preferred embodiment glazings 20, 30 and 40. These glazing assemblies are filled with inert gas, and do not include breather tubes. The meaning and significance of solar heat gain coefficients, U-values and light transmittance values are discussed above. The CRF Rating is the Condensation Resistance Factor is measured in a standard test and reflects the total capability of the window to resist the conditions that support condensation due to conduction and convection of cold, and air infiltration. Industry standards call for a minimum CRF of 35. The higher the CRF rating is, the better the window's resistance to condensation producing conditions. The R-value is the inverse of the U-value, such that higher ratings are better than lower. All ratings are calculated in accordance with the National Fenestration Rating Counsel (NFRC) Total Unit Calculations requirements.

TABLE 1

| | | | NFRC TOTAL UNIT CALCULATIONS | | | | |
|---|---|---|---|---|---|---|---|
| | GLAZING CONFIGURATION | | | | Solar Heat | Visible Light | |
| PRODUCT TYPE | Glazing Thickness | Glazing Option | U-Value | R-Value | Gain Co-efficient | Transmittance | CRF |
| WOOD TILT | ¾", no grilles | Embodiment 20 | 0.29 | 3.45 | 0.19 | 0.45 | 59 |
| | ¾", no grilles | Embodiment 30 | 0.29 | 3.45 | 0.19 | 0.44 | 56 |
| | ¾", w/grilles | Embodiment 20 | 0.29 | 3.45 | 0.17 | 0.40 | 59 |
| | ¾", w/grilles | Embodiment 30 | 0.30 | 3.33 | 0.17 | 0.39 | 56 |
| WOOD TILT TRANSOM | 1", no grilles | Embodiment 20 | 0.27 | 3.70 | 0.21 | 0.50 | 61 |
| | 1", no grilles | Embodiment 30 | 0.27 | 3.70 | 0.21 | 0.49 | 63 |
| | 1", no grilles | Embodiment 40 | 0.17 | 5.88 | 0.19 | 0.40 | 69 |

TABLE 1-continued

NFRC TOTAL UNIT CALCULATIONS

| PRODUCT TYPE | GLAZING CONFIGURATION | | U-Value | R-Value | Solar Heat Gain Coefficient | Visible Light Transmittance | CRF |
|---|---|---|---|---|---|---|---|
| | Glazing Thickness | Glazing Option | | | | | |
| | 1", w/grilles | Embodiment 20 | 0.27 | 3.70 | 0.19 | 0.45 | 61 |
| | 1", w/grilles | Embodiment 30 | 0.27 | 3.70 | 0.19 | 0.44 | 63 |
| WOOD HR175 | ⅝", no grilles | Embodiment 20 | 0.30 | 3.33 | 0.19 | 0.43 | 56 |
| | ⅝", no grilles | Embodiment 30 | 0.34 | 2.94 | 0.19 | 0.42 | 53 |
| | ⅝", w/grilles | Embodiment 20 | 0.32 | 3.13 | 0.17 | 0.38 | 56 |
| | ⅝", w/grilles | Embodiment 30 | 0.36 | 2.78 | 0.17 | 0.37 | 53 |
| WOOD CASEMENT | ¾", no grilles | Embodiment 20 | 0.27 | 3.70 | 0.20 | 0.46 | 62 |
| | ¾, no grilles | Embodiment 30 | 0.28 | 3.57 | 0.20 | 0.45 | 59 |
| | ⅞", no grilles | Embodiment 40 | 0.20 | 5.00 | 0.18 | 0.37 | 72 |
| | ¾", w/grilles | Embodiment 20 | 0.27 | 3.70 | 0.18 | 0.42 | 62 |
| | ¾", w/grilles | Embodiment 30 | 0.30 | 3.33 | 0.18 | 0.41 | 59 |
| WOOD AWNING | ¾", no grilles | Embodiment 20 | 0.27 | 3.70 | 0.19 | 0.45 | 59 |
| | ¾", no grilles | Embodiment 30 | 0.28 | 3.57 | 0.19 | 0.44 | 57 |
| | ⅞", no grilles | Embodiment 40 | 0.19 | 5.26 | 0.17 | 0.36 | 71 |
| | ¾", w/grilles | Embodiment 20 | 0.27 | 3.70 | 0.18 | 0.41 | 59 |
| | ¾", w/grilles | Embodiment 30 | 0.29 | 3.45 | 0.18 | 0.40 | 57 |
| WOOD DIRECT SET | 1", no grilles | Embodiment 20 | 0.25 | 4.00 | 0.24 | 0.56 | 60 |
| | 1", no grilles | Embodiment 30 | 0.27 | 3.70 | 0.24 | 0.56 | 59 |
| | 1", no grilles | Embodiment 40 | 0.14 | 7.14 | 0.22 | 0.46 | 75 |
| | 1", w/grilles | Embodiment 20 | 0.25 | 4.00 | 0.22 | 0.50 | 60 |
| | 1", w/grilles | Embodiment 30 | 0.27 | 3.70 | 0.22 | 0.51 | 59 |
| WOOD SLIDE BY | ¾", no grilles | Embodiment 20 | 0.28 | 3.57 | 0.20 | 0.48 | 58 |
| | ¾", no grilles | Embodiment 30 | 0.29 | 3.45 | 0.20 | 0.47 | 57 |
| | ¾", w/grilles | Embodiment 20 | 0.28 | 3.57 | 0.18 | 0.42 | 58 |
| | ¾", w/grilles | Embodiment 30 | 0.30 | 3.33 | 0.18 | 0.41 | 57 |
| INSWING FRENCH DOOR | 1", no grilles | Embodiment 20 | 0.31 | 3.23 | 0.16 | 0.36 | 63 |
| | 1", no grilles | Embodiment 30 | 0.30 | 3.33 | 0.16 | 0.35 | 63 |
| | 1", no grilles | Embodiment 40 | 0.24 | 4.17 | 0.14 | 0.29 | 63 |
| | 1", w/grilles | Embodiment 20 | 0.31 | 3.23 | 0.14 | 0.31 | 63 |
| | 1", w/grilles | Embodiment 30 | 0.30 | 3.33 | 0.14 | 0.30 | 63 |
| | ¾", no grilles | Embodiment 20 | 0.30 | 3.33 | 0.16 | 0.36 | 61 |
| | ¾", no grilles | Embodiment 30 | 0.32 | 3.13 | 0.16 | 0.35 | 58 |
| | ¾", w/grilles | Embodiment 20 | 0.31 | 3.23 | 0.14 | 0.30 | 60 |
| | ¾", w/grilles | Embodiment 30 | 0.33 | 3.03 | 0.14 | 0.30 | 58 |
| OUTSWING FRENCH DOOR | 1", no grilles | Embodiment 20 | 0.30 | 3.33 | 0.16 | 0.36 | 63 |
| | 1", no grilles | Embodiment 30 | 0.30 | 3.33 | 0.16 | 0.35 | 63 |
| | 1", no grilles | Embodiment 40 | 0.24 | 4.17 | 0.14 | 0.28 | 64 |
| | 1", w/grilles | Embodiment 20 | 0.30 | 3.33 | 0.14 | 0.31 | 63 |
| | 1", w/grilles | Embodiment 30 | 0.30 | 3.33 | 0.14 | 0.30 | 63 |
| | ¾", no grilles | Embodiment 20 | 0.30 | 3.33 | 0.16 | 0.36 | 61 |
| | ¾", no grilles | Embodiment 30 | 0.32 | 3.13 | 0.16 | 0.35 | 58 |
| | ¾", w/grilles | Embodiment 20 | 0.31 | 3.23 | 0.14 | 0.30 | 60 |
| | ¾", w/grilles | Embodiment 30 | 0.33 | 3.03 | 0.14 | 0.30 | 58 |
| WOOD SLIDING PATIO DOOR | ¾", no grilles | Embodiment 20 | 0.28 | 3.57 | 0.17 | 0.40 | 57 |
| | ¾", no grilles | Embodiment 30 | 0.30 | 3.33 | 0.17 | 0.39 | 54 |
| | ¾", w/grilles | Embodiment 20 | 0.28 | 3.57 | 0.15 | 0.34 | 57 |
| | ¾", w/grilles | Embodiment 30 | 0.32 | 3.13 | 0.15 | 0.33 | 54 |
| WOOD FRENCH SLIDING PATIO DOOR | ¾", no grilles | Embodiment 20 | 0.29 | 3.45 | 0.17 | 0.40 | 57 |
| | ¾", no grilles | Embodiment 30 | 0.31 | 3.23 | 0.18 | 0.39 | 54 |
| | ¾", w/grilles | Embodiment 20 | 0.29 | 3.45 | 0.15 | 0.34 | 57 |
| | ¾", w/grilles | Embodiment 30 | 0.33 | 3.03 | 0.15 | 0.33 | 54 |

The foregoing are preferred embodiments only, and variations will be apparent to those of ordinary skill in the art.

I claim:

1. A glazing assembly comprising:
a first pane of glass having a first surface defining the exterior surface of the glazing assembly, and an opposite second surface;
the first surface being coated with a smooth, hardened silica-containing coating comprising silica and about 5% aluminum and the second surface being coated with at least one layer of a low emissivity coating;
a second pane of glass joined to and spaced from the first pane of glass by a polymeric spacer, the polymeric spacer having an inner side facing inwardly toward the interior between adjacent panes of glass, an opposite outer side facing outwardly away from the interior, and two opposite edges adhered to the opposite facing surfaces of the joined sheets of glass.

2. The glazing assembly of claim 1, wherein:
the second surface of the first pane of glass is coated with three layers of low emissivity coating.

3. The glazing assembly of claim 1, wherein:
the second pane of glass has a third pane of glass laminated to it by a layer of polymeric laminating material having a thickness of at least about 30 mils (0.030 inches).

4. The glazing assembly of claim 1, further comprising:
a third pane of glass joined to and spaced from the second pane of glass by a second polymeric spacer;

the third pane of glass having a surface facing the second pane of glass, the facing surface being coated with at least one layer of low emissivity coating.

5. The glazing assembly of claim 4, further comprising:
insulating gas in the space between the first and second panes and the second and third panes of glass.

6. The glazing assembly of claim 1, further comprising:
insulating gas in the space between the first and second panes of glass.

7. The glazing assembly of claim 1, wherein:
the polymeric spacer comprises a strip of polymeric matrix carrying desiccant material, having an inside surface which faces inwardly into the space between the panes of glass, an outer surface facing outwardly away from the interior between the panes of glass, and two opposite edges; and
further including a strip of edge adhesive being positioned on each of the edges of the polymeric matrix and adhering the opposed panes of glass to the spacer and a vapor barrier layer on the outer surface of the matrix.

8. A glazing assembly comprising:
a first pane of glass having a first surface defining the exterior surface of the glazing assembly, and an opposite second surface;
the first surface being coated with a smooth, hardened silica-containing coating and the second surface being coated with a low emissivity coating consisting of three different layers;
a second pane of glass joined to and spaced from the first pane of glass by a polymeric spacer, the polymeric spacer having an inner side facing inwardly toward the interior between adjacent panes of glass, an opposite outer side facing outwardly away from the interior, and two opposite edges adhered to the opposite facing surfaces of the joined sheets of glass.

9. The glazing assembly of claim 8, wherein:
the three different layers comprise at least one infrared-reflective layer positioned between two transparent dielectric layers.

10. The glazing assembly of claim 9, wherein:
the dielectric layers comprise tin oxide.

11. The glazing assembly of claim 9, wherein:
the dielectric layers comprise titanium oxide.

12. The glazing assembly of claim 9, wherein:
the dielectric layers comprise a nitride.

13. The glazing assembly of claim 9, wherein:
the at least one infrared-reflective layer comprises gold.

14. The glazing assembly of claim 9, wherein:
the at least one infrared-reflective layer comprises copper.

15. The glazing assembly of claim 8, wherein:
the second pane of glass has a third pane of glass laminated to it by a layer of polymeric laminating material having a thickness of at least about 30 mils (0.030 inches).

16. The glazing assembly of claim 8, further comprising:
a third pane of glass joined to and spaced from the second pane of glass by a second polymeric spacer;
the third pane of glass having a surface facing the second pane of glass, the facing surface being coated with a low emissivity coating.

17. The glazing assembly of claim 16, further comprising:
insulating gas in the space between the first and second panes and the second and third panes.

18. The glazing assembly of claim 8, further comprising:
insulating gas in the space between the first and second panes of glass.

19. The glazing assembly of claim 8, wherein:
the polymeric spacer comprises a strip of polymeric matrix carrying desiccant material, having an inside surface which faces inwardly into the space between the panes of glass, an outer surface facing outwardly away from the interior between the panes of glass, and two opposite edges; and
further including a strip of edge adhesive being positioned on each of the edges of the polymeric matrix and adhering the opposed panes of glass to the spacer and a vapor barrier layer on the outer surface of the matrix.

* * * * *